US008885053B2

(12) United States Patent
Kai et al.

(10) Patent No.: US 8,885,053 B2
(45) Date of Patent: Nov. 11, 2014

(54) INTEGRATED CIRCUIT AND ELECTRIC DEVICE FOR AVOIDING LATENCY TIME CAUSED BY CONTENTION

(75) Inventors: Koji Kai, Fukuoka (JP); Tomonori Kataoka, Oonojyou (JP); Masayoshi Toujima, Kasuya-Gun (JP)

(73) Assignee: Panasonic Corporation, Osaka (JP)

( * ) Notice: Subject to any disclaimer, the term of this patent is extended or adjusted under 35 U.S.C. 154(b) by 1680 days.

(21) Appl. No.: 10/774,374

(22) Filed: Feb. 10, 2004

(65) Prior Publication Data
US 2004/0187165 A1 Sep. 23, 2004

(30) Foreign Application Priority Data

Feb. 20, 2003 (JP) ................................. 2003-042438

(51) Int. Cl.
*H04N 5/225* (2006.01)
*H04N 21/426* (2011.01)
*G06F 13/16* (2006.01)

(52) U.S. Cl.
CPC ........ *H04N 21/42615* (2013.01); *G06F 13/161* (2013.01); *H04N 21/426* (2013.01); *H04N 21/42692* (2013.01); *Y02B 60/1228* (2013.01)
USPC .................. 348/207.99; 348/222.1

(58) Field of Classification Search
CPC .............................................. H04N 21/42615
USPC .............. 348/222.1, 220.1, 207.99, 374, 552; 725/151, 153, 134, 89, 124, 142
See application file for complete search history.

(56) References Cited

U.S. PATENT DOCUMENTS

| 5,487,146 | A | * | 1/1996 | Guttag et al. | 345/519 |
| 5,860,086 | A |   | 1/1999 | Crump et al. | |
| 5,918,073 | A | * | 6/1999 | Hewitt | 710/52 |
| 6,035,349 | A | * | 3/2000 | Ha et al. | 710/68 |
| 6,297,843 | B1 |  | 10/2001 | Glew | |

(Continued)

FOREIGN PATENT DOCUMENTS

| CN | 1274455 | 11/2000 |
| EP | 1056290 A2 * | 11/2000 |

(Continued)

OTHER PUBLICATIONS

H.-J. Stolberg et al., "The M-PIRE MPEG-4 CODEC DSP and Its Macroblock Engine", Multimedia and Expo, 2001, ICME 2001, IEEE International Conference On, [Online] Aug. 25, 2001, pp. 230-233, Retrieved from the Internet: URL:http://ieeexplore.ieee.org/iel5/8766/27769/01237698.pdf?tp=&arnumber=1237698&isnumber=27769>[retrieved on Mar. 13, 2006].

(Continued)

*Primary Examiner* — Nelson D. Hernández Hernández
(74) *Attorney, Agent, or Firm* — Wenderoth, Lind & Ponack, L.L.P.

(57) ABSTRACT

An integrated circuit including a shared memory connected to a bus, an audio/multiplex/de-multiplex processor accessing the shared memory via the bus, a video processor performing heavy processes accessing the shared memory via the bus, and a local memory accessed by the video processor without passing through the bus. The integrated circuit avoids a latency time caused by access contention, such that a probability that the integrated circuit can complete processes to be done in real time is increased. Image data is displayed on the display device smoothly without deterioration of quality of display.

18 Claims, 2 Drawing Sheets

(56) References Cited

U.S. PATENT DOCUMENTS

| | | | | |
|---|---|---|---|---|
| 6,504,825 | B1* | 1/2003 | Atkins et al. | 370/254 |
| 6,714,660 | B1* | 3/2004 | Ohba | 382/103 |
| 7,079,750 | B2* | 7/2006 | Nomura et al. | 386/207 |
| 2002/0012522 | A1* | 1/2002 | Kawakami et al. | 386/52 |
| 2002/0059649 | A1* | 5/2002 | Ichioka | 725/153 |

FOREIGN PATENT DOCUMENTS

| | | |
|---|---|---|
| JP | 8-77347 | 3/1996 |
| JP | 10-240681 | 9/1998 |
| JP | 11-065919 | 3/1999 |
| JP | 3026984 | 1/2000 |

OTHER PUBLICATIONS

Gert Slavenburg, "TriMedia TM-1000; Preliminary data book", Product Sheet, [Online] 1997, pp. 2-1-2-6, North America, Retrieved from the Internet: URL:http://www.semiconductors.philips.com/acrobat_download/other/tm1000.pdf> [retrieved on Mar. 13, 2006].

J. Kneip et al., "Applying and Implementing the MPEG-4 Multimedia Standard", IEEE Micro, [Online] vol. 19, No. 6, Dec. 1999, pp. 64-74, Retrieved from the Internet: URL:http://ieeexplore.ieee.org/iel5/40/17556/00809379.pdf?tp=&arnumber=809379&isnumber=17556> [retrieved on Feb. 13, 2006].

Masafumi Takahashi et al., "MPEG-4 LSI, System LSI Technology for MPEG-4 Audiovisual LSI", IMT2000 (International Mobile Telecommunications—2000), PDA, MPEG-4 (Motion Picture Experts Group 4), vol. 57, No. 1, pp. 50-53.

Office Action issued Jul. 7, 2008 in the European Application No. 04 002 308.7.

Lance Hammond et al., "The Stanford Hydra CMP", IEEE Micro 2000, Mar.-Apr. 2000, pp. 71-84.

* cited by examiner

INTEGRATED CIRCUIT AND ELECTRIC DEVICE FOR AVOIDING LATENCY TIME CAUSED BY CONTENTION

BACKGROUND OF THE INVENTION

1. Field of the Invention

The present invention relates to an integrated circuit and an electric device using thereof. More particularly, it relates to improvement of techniques when the integrated circuit comprises a plurality of processors and the plurality of processors access a shared memory via a bus.

2. Description of the Related Art

In recent years, multimedia data composed of video data, audio data and other kinds of data, is often processed in an electric device. In the electric device, a special-purpose processor or a general-purpose processor, mounted therein, processes the multimedia data.

When the processor mounted therein has very high performance and power consumed by the processor need not be saved, all of necessary processes can be performed by the processor alone.

However, a portable electric device, e.g., a cellular phone, a PDA, a digital video camera, a digital still camera, and so on, is powered by a battery in most cases. Therefore, in the portable electric device, it is desirable to reconcile reducing power consumption and improving performance so that the portable electric device becomes smaller, lighter and more efficient. There is the same problem as described above, in a non-portable electric device, e.g. a DVD player, a DVD recorder, HD recorder, and so on, for saving resources and/or energy.

A document (title: "System LSI techniques for MPEG-4 LSI", TOSHIBA REVIEW, Vol. 57, No. 1 (2002)) discloses the following points, to reconcile retaining sufficient performance and reducing power consumption in an integrated circuit, which processes the multimedia data.

(Point 1) Since it is difficult to acquire sufficient throughput only by a single processor, a processor that processes video signals and a processor that processes audio signals are provided, that is, a multi-processor configuration is adopted.

(Point 2) Considering that I/O between chips of a processor consumes more than one half of the power, a memory, which is shared by both the processor that processes the video signals and the processor that processes the audio signals, is provided in an integrated circuit of the processor, and these processors access the shared memory via a bus. Thereby, reducing the power consumed by the I/O between the chips.

Next, referring to FIG. 2, the conventional technique will now be explained more concretely. FIG. 2 is an outline block diagram of a conventional integrated circuit.

As shown in FIG. 2, an integrated circuit 1 comprises a bus 2 in itself. A shared memory 3 is connected to the bus 2.

A video processor 4 processing video signals, an audio processor 5 processing audio signals, and a multiplex/de-multiplex processor 6 multiplexing/de-multiplexing a bit stream, are provided, that is, a multi-processor configuration is adopted. These processors 4, 5 and 6 are connected to the bus 2. Herein, the video processor 4, the audio processor 5 and the multiplex/de-multiplex processor 6 have buffer memories 7, 8 and 9 in themselves, respectively.

These processors 4, 5, and 6 access the shared memory 3 via the bus 2 and perform processes in parallel, cooperating with each other.

According to this configuration, since the shared memory 3 is accessed from all of the video processor 4, the audio processor 5, and the multiplex/de-multiplex processor 6, access to the bus 2 may be contended. Then, the bus 2 arbitrates the access. As a result, since at least one of the processors 4, 5 and 6 should await access, latency time must arise.

Processes of the video processor 4 are heavier than those of the audio processor 5 and the multiplex/de-multiplex processor 6. Unless the video processor 4 accesses the shared memory 3 at high speed without latency time, the processes of the video processor 4 delay and the video processor 4 may not be able to complete processes to be done in a predetermined time.

Since the conventional techniques fail to consider that load of one of the plurality of processors is different from those of the other, in some cases, the plurality of processors as a whole cannot complete processes to be done in real time.

OBJECTS AND SUMMARY OF THE INVENTION

An object of the present invention is to provide an integrated circuit reducing power consumption and performing processes in real time, and arts related thereto.

A first aspect of the present invention provides an integrated circuit comprising: a bus; a first memory connected to the bus; a first processing unit operable to access the first memory via the bus; a second processing unit operable to access the first memory via the bus, and operable to perform at least one of data processing and calculation in a larger amount than the first processing unit; and a second memory operable to be accessed by the second processing unit without passing through the bus.

With this structure, since the second processing unit, which performs at least one of data processing and calculation in a larger amount than the first processing unit, uses the second memory, the second processing unit is released from contention of access to the first memory. That is, the second processing unit can process without latency time caused by the contention, and a probability that the integrated circuit can complete processes to be done in real time increases.

Although access to the first memory and the second memory arises frequently, since the access is performed without I/O between chips, power can be saved.

A second aspect of the present invention provides an integrated circuit as defined in the first aspect of the present invention, wherein the first processing unit expands compressed audio signals, wherein the second processing unit expands compressed video signals, and wherein the second processing unit stores reference image data into the second memory, the reference image data being generated when the compressed video signals are expanded.

With this structure, the integrated circuit can be used as a decoder that decodes compressed multimedia data. The decoder can expand compressed video signals without latency time caused by contention of access, although burden of expanding the compressed video signals is heavy. Accordingly, a probability that the integrated circuit can complete processes to be done in real time can remain high.

A third aspect of the present invention provides an integrated circuit as defined in the first aspect of the present invention, wherein the first processing unit compresses audio signals, wherein the second processing unit compresses video signals, and wherein the second processing unit stores reference image data into the second memory, the reference image data being generated when the compressed video signals are expanded.

With this structure, the integrated circuit can be used as an encoder that compresses multimedia data. The encoder can compress the video signals without latency time caused by contention of access, although burden of compressing the video signals is heavy. Accordingly, a probability that the integrated circuit can complete processes to be done in real time can remain high.

A fourth aspect of the present invention provides an integrated circuit as defined in the first aspect of the present invention, wherein the first processing unit performs at least one of de-multiplexing audio signals and video signals from a bit stream and multiplexing audio signals and video signals into a bit stream.

With this structure, since the first processing unit, whose burden is not as heavy as that of the second processing unit, also handles a bit stream, the integrated circuit can be constituted compactly.

A fifth aspect of the present invention provides an integrated circuit as defined in the first aspect of the present invention, wherein the second processing unit generates computer graphics image data.

With this structure, since the second processing unit also handles a computer graphics image, the second processing unit can collectively and efficiently operate video signals and the computer graphics image, which have strong relationship mutually.

A sixth aspect of the present invention provides an electric device comprising: an integrated circuit; and a converter, wherein the integrated circuit comprises: a bus; a first memory connected to the bus; a first processing unit operable to access the first memory via the bus; a second processing unit operable to access the first memory via the bus, and operable to perform at least one of data processing and calculation in a larger amount than the first processing unit; and a second memory operable to be accessed by the second processing unit without passing through the bus, wherein the first processing unit expands compressed audio signals, wherein the second processing unit expands compressed video signals to generate video signals, wherein the second processing unit stores reference image data into the second memory, the reference image data being generated when the compressed video signals are expanded, and wherein the converter is operable to convert the audio signals expanded by the first processing unit into analogue audio signals.

With this structure, since the third decoder is mounted on the electric device, the electric device fulfils reproducing functions.

A seventh aspect of the present invention provides an electric device as defined in the sixth aspect of the present invention, further comprising: a display device operable to input the video signals generated by the second processing unit to display an image; and a playback device operable to reproduce sounds according to the analogue audio signals converted by the converter.

With this structure, in addition to effects of the sixth aspect, the electric devices can be used as a monitor reproducing both images and sounds.

An eighth aspect of the present invention provides an electric device as defined in the sixth aspect of the present invention, wherein the second processing unit generates computer graphics image data.

With this structure, the second processing unit can collectively and efficiently operate video signals and computer graphics images, which have strong relationship mutually.

A ninth aspect of the present invention provides an electric device comprising: a camera; a microphone; an integrated circuit; and a converter, wherein the integrated circuit comprises: a bus; a first memory connected to the bus; a first processing unit operable to access the first memory via the bus; a second processing unit operable to access the first memory via the bus, and operable to perform at least one of data processing and calculation in a larger amount than the first processing unit; and a second memory operable to be accessed by the second processing unit without passing through the bus, wherein the first processing unit compresses audio signals, wherein the second processing unit inputs video signals from the camera to compress the video signals, wherein the second processing unit stores reference image data into the second memory, the reference image data being generated when the compressed video signals are expanded, and wherein the converter is operable to input analogue audio signals from the microphone to convert the analogue audio signals into digital audio signals, and operable to output the digital audio signals to the first processing unit.

With this structure, since the fourth encoder is mounted on the electric device, the electric device fulfils recording functions.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
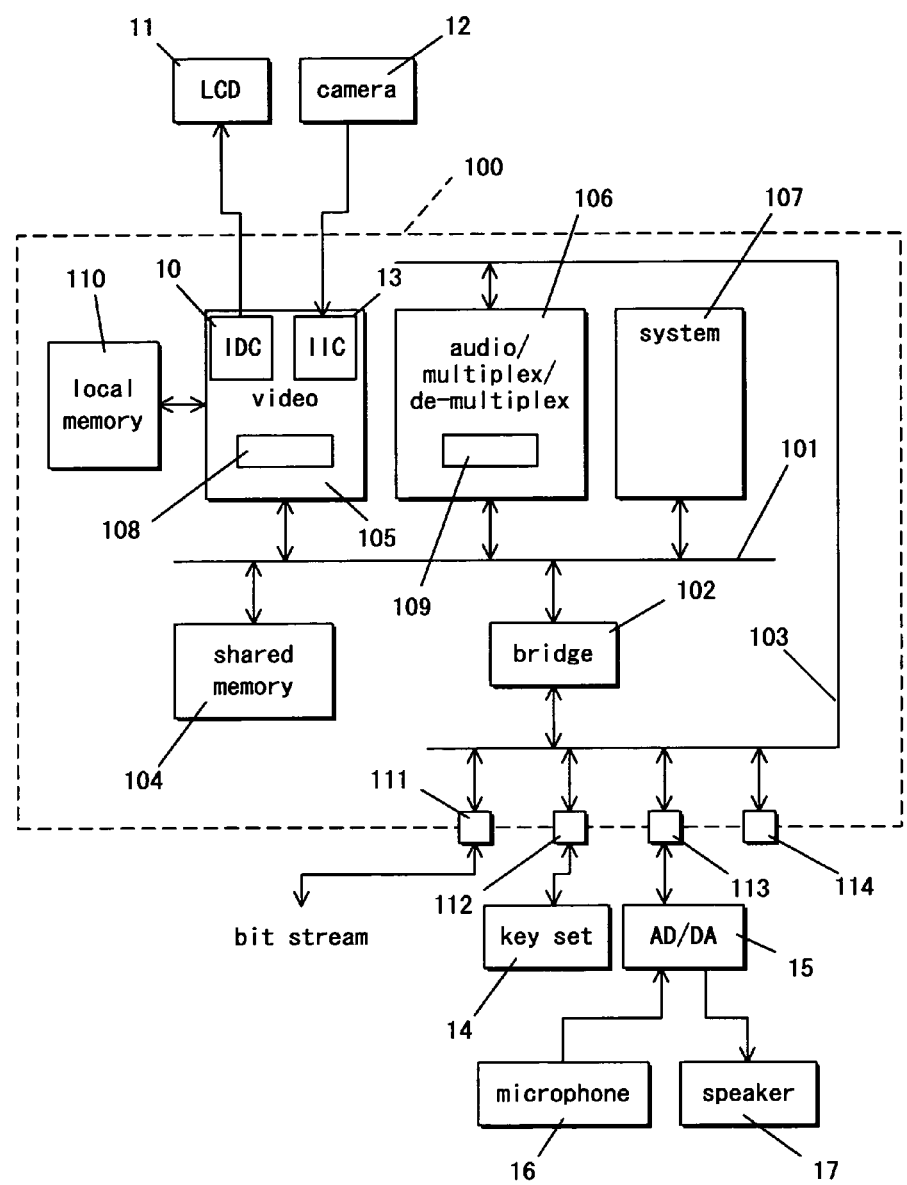
FIG. 1 is a block diagram of an electric device in an embodiment of the present invention.
Figure 2:
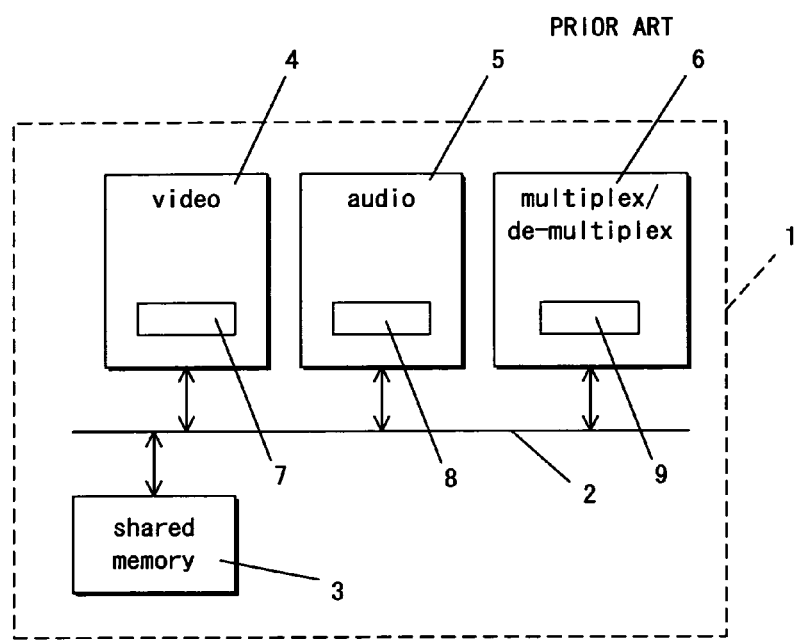
FIG. 2 is an outline block diagram of a conventional integrated circuit.

Next, referring to a drawing, an embodiment of the present invention will now be explained. FIG. 1 is a block diagram of an electric device in an embodiment of the present invention.

This embodiment is explained using an example of a cellular phone as an electric device. However, an electric device to which the present invention can be applied may be one of the electric devices described in "Description of the Related Art". Furthermore, the electric device to which the present invention can be applied may be one of a TV apparatus, a TV conference system, a navigation system, and a surveillance camera apparatus, and so on, each of which at least one of the electric devices described in "Description of the Related Art" is build in.

As shown in FIG. 1, the electric device comprises an integrated circuit 100. In this embodiment, the integrated circuit 100 is an encoder/decoder supporting MPEG (Moving Picture Coding Experts Group) 4. However, if necessary, the integrated circuit 100 may be either an encoder or a decoder. For example, when the electric device is a DVD player, since the electric device need not have functions of an encoder, the integrated circuit 100 may be constituted as only a decoder. On the contrary, when the electric device is a surveillance camera apparatus, the integrated circuit 100 may be constituted as only an encoder.

Video signal processes of the integrated circuit 100 may support at least one of ITU-T (International Telecommunication Union-Telecommunication sector) H.263, and JPEG (Joint Photographic Experts Group), and so on.

Audio signal processes of the integrated circuit 100 may support at least one of AMR (Adaptive Multi Rate), ITU-T G279, ITU-T G273.1, voice CODEC, MP3 (MPEG-1 Audio Layer3), and AAC-LC (Advanced Audio Coding-Low Complexity), and so on.

In FIG. 1, for simplicity of explanation, it is assumed that audio signals are composed of monaural components. However, the audio signals may be extended to, e.g. stereo (2 ch), 5.1 ch, 7.1 ch, and so on.

As shown in FIG. 1, the integrated circuit 100 comprises a main bus 101 in itself. In addition, a peripheral bus 103 is provided in the integrated circuit 100, and a bridge circuit 102 connects the main bus 101 and the peripheral bus 103. A shared memory 104, which corresponds to first memory, is connected to the main bus 101.

In the integrated circuit 100, a video processor 105 processing video signals, an audio/multiplex/de-multiplex processor 106 processing audio signals and multiplexing/de-multiplexing a bit stream, and a system processor 107 controlling the whole system. That is, a multi-processor configuration is adopted. These processors 105, 106, and 107 are connected to the main bus 101. The video processor 105 and the audio/multiplex/de-multiplex processor 106 have buffer memories 108 and 109 in themselves, respectively.

Herein, the audio/multiplex/de-multiplex processor 106 corresponds to a first processing unit, the video processor 105 corresponds to a second processing unit, and the system processor 107 corresponds to a control unit. The video processor 105 includes in itself an image input circuit 13 and an image display circuit 10, which will be explained in detail later.

In this embodiment, the audio/multiplex/de-multiplex processor 106, whose burden is not as heavy as that of the video signal processor 105, collectively processes audio signals and multiplexes/de-multiplexes a bit stream. However, of course, a processor processing the audio signals and a processor multiplexing/de-multiplexing the bit stream may be provided independently.

In this embodiment, the video processor 105 performs not only video signal processes but also generates/edits computer graphics images. The computer graphics images are blended with video signals or are dealt with independently. It is convenient to handle usual video signals and the computer graphics images collectively, since the usual video signals and the computer graphics images have strong relationship mutually. However, processing computer graphics images may be omitted.

In any case, a burden of the video processor 105 is heavier than that of the audio/multiplex/de-multiplex processor 106. That is, the video processor 105 should perform a larger amount of data processing and calculation than the audio/multiplex/de-multiplex processor 106. Therefore, a local memory 110 is provided in the integrated circuit 100, and the video processor 105 occupies the local memory 110.

The video processor 105 stores data in the local memory 110 and reads data from the local memory 110. The data is composed of reference image data generated while the video signals are processed (expanded or compressed), data of the computer graphics images, and data of instructions accompanying thereto. The data may be transferred with or without using a DMAC (Direct Memory Access Controller).

Since the video processor 105 accesses the local memory 110 without passing through the main bus 101, even when the main bus 101 is contended, latency time of the video processor 105 does not occur. Herein, the local memory 110 corresponds to a second memory.

A first interface 111, a second interface 112, a third interface 113, and a fourth interface 114 are connected to the peripheral bus 103. A bit stream is outputted and inputted using the first interface 111. Status information, which may indicate codes of entered characters or entered numbers, is inputted from a key set 14 using the second interface 112.

An AD (analog-to-digital)/DA (digital-to-analog) converter 15 is connected to the third interface 113, and the AD/DA converter 15 is connected to the audio/multiplex/de-multiplex processor 106 via the peripheral bus 103.

When a microphone 16 outputs analogue audio signals to the AD/DA converter 15, the AD/DA converter 15 carries out analogue-to-digital conversion of the analogue audio signals to output digital audio signals thereof to the audio/multiplex/de-multiplex processor 106. When the audio/multiplex/de-multiplex processor 106 output digital audio signals to the AD/DA converter 15, the AD/DA converter 15 carries out digital-to-analogue conversion of the digital audio signals to output analogue audio signals thereof to a speaker 17 and the speaker 17 reproduces sounds thereto. Herein, the speaker 17 corresponds to a playback device. Otherwise, a headphone or the like may be used as a playback device.

The video processor 105 expands video signals using the local memory 110. The image display circuit 10 of the video processor 105 generates video signals based on the expanded video signals to output the generated video signals to an LCD 11, which corresponds to a display device, and the LCD 11 displays an image according to the generated video signals. Otherwise, an organic electro-luminescence display, a Braun tube, and a plasma display, or the like may be used as the display device.

The image display circuit 10 has functions converting image data of YUV format or image data of RGB format into video signals. The video processor 105 transmits image data stored in the local memory 110 to the image display circuit 10. The image data may be transferred with or without using the DMAC.

When a camera 12 shoots and outputs image data to the image input circuit 13 of the video processor 105, the image input circuit 13 generates video signals, and the video processor 105 compresses the video signals using the local memory 110.

The image input circuit 13 has a function converting video signals into image data of YUV format, which includes luminance signals and chroma signals, and a function converting video signals into image data of RGB format, which includes red signals, green signals, and blue signals. Converting video signals into image data as described above, the video processor 105 becomes able to process video signals.

The video processor 105 transmits the image data converted by the image input circuit 13 to the local memory 110. The image data may be transferred with or without using the DMAC.

Next, operation when a bit stream is inputted will now be explained. First, when a bit stream is inputted from the first interface 111, the bit stream is inputted into the audio/multiplex/de-multiplex processor 106, and audio signals and video signals are de-multiplexed from the bit stream by the audio/multiplex/de-multiplex processor 106.

The audio/multiplex/de-multiplex processor 106 transmits the de-multiplexed video signals to the video processor 105, and the audio/multiplex/de-multiplex processor 106 begins to expand the de-multiplexed audio signals in itself.

When the video processor 105 receives the video signals, the video processor 105 expands the video signals using the local memory 110. Herein, since the video processor 105 occupies the local memory 110 and access of the video processor 105 to the local memory 110 is not interrupted by contention in the main bus 101, the video processor 105 can expand the video signals without delay.

The expanded video signals are transmitted to the LCD 11 via the image display circuit 10 of the video processor 105, and the LCD 11 displays an image according to the expanded video signals. Besides, the expanded audio signals are transmitted via the audio/multiplex/de-multiplex processor 106, the main bus 101, the bridge circuit 102, the peripheral bus 103, and the third interface 113, to the AD/DA converter 15. The AD/DA converter 15 converts the expanded audio signals into analogue audio signals, and the speaker 17 reproduces some sounds according to the analogue audio signals.

Next, operation when a bit stream is outputted will now be explained. First, when the camera 12 begins operation, image data obtained by the camera 12 is inputted into the image input circuit 13 of the video processor 105, the image input circuit 13 generates video signals, and the video processor 105 compresses the video signals using the local memory 110. Herein, since the video processor 105 occupies the local memory 110 and access of the video processor 105 to the local memory 110 is not interrupted by contention in the main bus 101, the video processor 105 can expand the video signals without delay.

Besides, when the microphone 16 begins operation, analogue audio signals are converted into digital audio signals by the AD/DA converter 15, the digital audio signals are transmitted to the audio/multiplex/de-multiplex processor 106 via the third interface 113, and the peripheral bus 103, the bridge circuit 102, and the main bus 101. Then, the audio/multiplex/de-multiplex processor 106 compresses the digital audio signals.

When the video processor 105 has completed the compression of the video signals, the compressed video signals are transmitted to the audio/multiplex/de-multiplex processor 106, the audio/multiplex/de-multiplex processor 106 multiplexes the compressed video signals and the audio signals compressed by itself, and the multiplexed bit stream is outputted to the outside, e.g. recording medium, of the integrated circuit 100 via the main bus 101, the bridge circuit 102, the peripheral bus 103, and the first interface 111.

While the audio/multiplex/de-multiplex processor 106 is performing some processes using the shared memory 104, the video processor 105 can perform the following processes using the local memory 110 without access contention.

(1) Compressing image data, stored in the local memory 110 via the image input circuit 13;
(2) Expanding compressed data to image data;
(3) Generating image data using computer graphics operation; and
(4) Processing/editing image data.

Thereby, reducing memory access contention, probability that the integrated circuit 100 can complete processes to be done in real time increases.

According to the present invention, since a processing unit, whose burden is heavy, occupies the second memory, avoiding latency time caused by contention of access to the shared memory or the first memory, probability that the integrated circuit 100 can complete processes to be done in real time increases.

Since latency time caused by access contention is avoidable, when image data is inputted, image data can be inputted smoothly, and when image data is outputted, image data is displayed on the display device smoothly without deterioration of quality of display.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An integrated circuit for processing image data, said integrated circuit comprising:
   a bus;
   a first memory connected to said bus;
   a first processing unit connected to said bus, said first processing unit being configured to access said first memory via said bus;
   a second processing unit connected to said bus, said second processing unit being configured to access said first memory via said bus; and
   a second memory not connected to said bus and directly connected to said second processing unit, said second memory being configured to be accessed by said second processing unit without passing through said bus,
   wherein said first processing unit de-multiplexes an inputted bit stream into an audio signal and a video signal to transmit the de-multiplexed video signal to said second processing unit via said first memory, and
   wherein said first processing unit expands the de-multiplexed audio signal using said first memory, and at the same time said second processing unit expands the de-multiplexed video signal using said second memory.

2. The integrated circuit as recited in claim 1, further comprising
   a system processing unit connected to said bus, said system processing unit being configured to control a whole system including said first processing unit and said second processing unit.

3. The integrated circuit as recited in claim 1, wherein, without access contention between said first processing unit and said second processing unit, said first processing unit expands the de-multiplexed audio signal and said second processing unit expands the de-multiplexed video signal.

4. The integrated circuit as recited in claim 1, wherein said second memory is configured to be occupied by said second processing unit.

5. The integrated circuit as recited in claim 1, wherein
   said first processing unit includes a first buffer memory separated from said first memory, and
   wherein said second processing unit includes a second buffer memory separated from said second memory.

6. The integrated circuit as recited in claim 1, wherein said second processing unit stores reference image data onto said second memory, the reference image data being generated when the de-multiplexed video signal is expanded.

7. The integrated circuit as recited in claim 1, wherein said second processing unit generates computer graphics image data.

8. The integrated circuit as recited in claim 1, wherein said second processing unit includes an image output circuit that generates an image output signal from the expanded de-multiplexed video signal to output the generated image output signal to an image display device located outside said integrated circuit.

9. The integrated circuit as recited in claim 1, further comprising
   a peripheral bus connected to said first processing unit; and
   an audio interface connected to said peripheral bus,
   wherein said audio interface receives the expanded de-multiplexed audio signal from said first processing unit via said peripheral bus and generates an audio output signal to output the generated audio output signal to an audio playback device located outside said integrated circuit.

10. An integrated circuit for processing image data, said integrated circuit comprising:
   a bus;
   a first memory connected to said bus;
   a first processing unit connected to said bus, said first processing unit being configured to access said first memory via said bus;
   a second processing unit connected to said bus, said second processing unit being configured to access said first memory via said bus; and
   a second memory not connected to said bus and directly connected to said second processing unit, said second memory being configured to be accessed by said second processing unit without passing through said bus,
   wherein said first processing unit compresses an audio signal using said first memory, and at the same time said second processing unit compresses a video signal using said second memory, and
   wherein said first processing unit receives the compressed video signal from said second processing unit via said first memory, and multiplexes the compressed audio signal and the compressed video signal into a bit stream to be outputted therefrom.

11. The integrated circuit as recited in claim 10, further comprising
   a system processing unit connected to said bus, said system processing unit being configured to control a whole system including said first processing unit and said second processing unit.

12. The integrated circuit as recited in claim 10, wherein, without access contention between said first processing unit and said second processing unit, said first processing unit compresses the audio signal and said second processing unit compresses the video signal.

13. The integrated circuit as recited in claim 10, wherein said second memory is configured to be occupied by said second processing unit.

14. The integrated circuit as recited in claim 10, wherein said first processing unit includes a first buffer memory separated from said first memory, and said second processing unit includes a second buffer memory separated from said second memory.

15. The integrated circuit as recited in claim 10, wherein said second processing unit stores reference image data onto said second memory, the reference image data being generated when the compressed video signal is expanded.

16. The integrated circuit as recited in claim 10, wherein said second processing unit generates computer graphics image data.

17. The integrated circuit as recited in claim 10, wherein said second processing unit includes an image input circuit that inputs an image input signal from an image capture device located outside said integrated circuit.

18. The integrated circuit as recited in claim 10, further comprising
   a peripheral bus connected to said first processing unit; and
   an audio interface connected to said peripheral bus,
   wherein said audio interface receives an audio input signal from an audio capture device located outside said integrated circuit to output the inputted audio input signal to said first processing unit via said peripheral bus.

* * * * *